United States Patent
Nakamura (10) Patent No.: US 7,401,000 B2
(45) Date of Patent: Jul. 15, 2008

(54) ACOUSTIC VIBRATION ANALYZING APPARATUS AND ACOUSTIC VIBRATION ANALYZING METHOD, PROGRAM FOR ANALYZING ACOUSTIC VIBRATION, AND RECORDING MEDIUM, READABLE BY COMPUTER, ON WHICH PROGRAM FOR ANALYZING ACOUSTIC VIBRATION IS STORED

(75) Inventor: Takaaki Nakamura, Hamamatsu (JP)

(73) Assignee: Honda Motor Co., Ltd. (JP)

( * ) Notice: Subject to any disclaimer, the term of this patent is extended or adjusted under 35 U.S.C. 154(b) by 115 days.

(21) Appl. No.: 10/567,996

(22) PCT Filed: Aug. 27, 2004

(86) PCT No.: PCT/JP2004/012785

§ 371 (c)(1),
(2), (4) Date: Feb. 10, 2006

(87) PCT Pub. No.: WO2005/022095

PCT Pub. Date: Mar. 10, 2005

(65) Prior Publication Data

US 2007/0032968 A1    Feb. 8, 2007

(30) Foreign Application Priority Data

Aug. 28, 2003 (JP) ............... 2003-209353
Jun. 30, 2004 (JP) ............... 2004-194413

(51) Int. Cl.
*G01P 3/00* (2006.01)
(52) U.S. Cl. .................................. 702/145
(58) Field of Classification Search .......... 702/39, 702/48, 54, 56, 60, 75, 96, 98, 103, 138, 702/142, 145, 151, 159; 369/30.04; 386/65
See application file for complete search history.

(56) References Cited

U.S. PATENT DOCUMENTS

| | | | | |
|---|---|---|---|---|
| 4,649,743 | A * | 3/1987 | Sugimoto et al. | 73/162 |
| 4,823,596 | A * | 4/1989 | Meyers et al. | 73/118.1 |
| 4,988,979 | A * | 1/1991 | Sasaki et al. | 340/683 |
| 5,574,646 | A * | 11/1996 | Kawasaki et al. | 701/111 |
| 2002/0103595 | A1* | 8/2002 | Kostun | 701/111 |

FOREIGN PATENT DOCUMENTS

| | | |
|---|---|---|
| JP | 01-260327 | 10/1989 |
| JP | 05-026722 | 2/1993 |

(Continued)

*Primary Examiner*—Edward Raymond
*Assistant Examiner*—Mohamed Charioui
(74) *Attorney, Agent, or Firm*—Fish & Richardson P.C.

(57) ABSTRACT

The present invention provides an acoustic vibration analyzing apparatus for carrying out acoustic vibration analysis by picking up data of sounds generated due to rotation of a plurality of gears and data of the number of revolutions of a gear selected from a plurality of gears when a transmission of a vehicle having the plurality of gears operates. The acoustic vibration analyzing apparatus comprises an acoustic vibration calculation portion for analyzing acoustic data in terms of frequency, an order calculation portion for calculating an order in compliance with the specifications of a plurality of gears, a speed calculation portion for calculating the speed of a vehicle, and a display unit for displaying acoustic pressure levels with the order and vehicle speed associated therewith.

6 Claims, 7 Drawing Sheets

FOREIGN PATENT DOCUMENTS

| | | |
|---|---|---|
| JP | 5-157614 | 6/1993 |
| JP | 8-122140 | 5/1996 |
| JP | 2596081 | 1/1997 |
| JP | 10-274595 | 10/1998 |
| JP | 2001-194221 | 7/2001 |
| JP | 2002-257685 | 9/2002 |

* cited by examiner

ACOUSTIC VIBRATION ANALYZING APPARATUS AND ACOUSTIC VIBRATION ANALYZING METHOD, PROGRAM FOR ANALYZING ACOUSTIC VIBRATION, AND RECORDING MEDIUM, READABLE BY COMPUTER, ON WHICH PROGRAM FOR ANALYZING ACOUSTIC VIBRATION IS STORED

TECHNICAL FIELD

The present invention relates to an apparatus for analyzing sound or vibration generated due to rotation of a rotating body, and in particular, to an apparatus and a method of analyzing abnormal sounds by investigating the correlation between sensory inspection carried out while causing a vehicle to actually run, and gear sounds generated from a transmission, a program used therefor, and a recording medium, readable by a computer, in which the program is stored.

The present application is based on the priority of Japanese Patent Application No. 2003-209353 filed on Aug. 28, 2003, and Japanese Patent Application No. 2004-194413 filed on Jun. 30, 2004, the contents of which are incorporated herein by reference.

BACKGROUND ART

As an apparatus equipped with a rotating body such as a gear is run, there are cases in which continuous sounds continuously generated regardless of running state, non-continuous sounds generated in a particular running state, and vibrations not accompanying any sound are generated. Of these sounds and vibrations, teeth-contacting sounds generated due to rotation of gears with their teeth engaged with each other, and sounds generated from the rolling surface of a bearing (hereinafter, these sounds are called abnormal sounds) may be listed as non-continuous sounds. Conventionally, for the purpose of preventing such abnormal sounds from being generated, sensory inspection is carried out by an operator, or an apparatus for analyzing such abnormal sounds is developed.

An analyzing apparatus disclosed in Japanese Published Examined Patent Application No. 2596081 (pages 2 and 3, and FIG. 1) measures vibrations generated in response to rotation speeds in a predetermined range while varying the rotation speeds of gears, and picks up signals in a frequency range determined in response to the rotation speed and number of teeth of gears among signals obtained by analyzing the frequencies in connection with the vibrations. In accordance with the analyzing apparatus, the maximum value of abnormal noise is extracted.

Another analyzing apparatus, disclosed in Japanese Published Unexamined Patent Application No. 2002-257685 (paragraphs 0015 and 0016, and FIG. 4) simultaneously measures unevenness of rotation speeds when gears rotate, and acoustic pressure of sounds generated from the gears, and compares the waveforms of the respective signals. In accordance with the analyzing apparatus, it can be distinguished whether sounds being generated from a gear transmission having gears are resulting from gears or from other factors.

Still another analyzing apparatus, disclosed in Japanese Published Unexamined Patent Application No. 2001-194221 (paragraphs 0029 and 0030, and FIG. 13) picks up running sounds as data by attaching a sound collecting microphone and a recorder to a motorcycle, and identifies sounds of an already known volume, degree or order, whose ratio is comparatively high, among all sounds, using an order filter. In accordance with the analyzing apparatus, evaluation can be carried out based on the order of the sounds.

Incidentally, with conventional analyzing apparatuses, it is impossible to identify a place from which abnormal sounds being generated, if there is a plurality of rotating bodies. Also, even if an attempt is made to identify a place at which abnormal sounds being generated by way of sensory inspection, unevenness in results of sensory inspection is liable to occur because such a inspection is based on the sensitivity of a human being, and it is difficult to investigate the correlation between the results of the sensory inspection and the actually measured results. In particular, in a unit such as a transmission of an automobile, in which gears are disposed multi-axially on a rotating shaft, or multi-axial rotating shafts are incorporated, a number of places may be guessed to be the place where abnormal sounds are occurring, and it is difficult to identify the place of occurrence of the abnormal sounds.

In addition, with the conventional apparatuses, evaluation is carried out based on the elapsed time during a number of revolutions of a rotating body, and since the actual vehicle speed is different from the rotation speed of the rotating body when an object to be inspected such as an automobile moves, it is difficult to investigate the correlation of the results measured.

Further, in judgment based on maximum value as in the analyzing apparatus described in Japanese Published Examined Patent Application No. 2596081, if the volume of the abnormal sounds is low, it is not possible to detect the frequency even if it can be sensed by a human being.

The present invention has been developed to solve the above-described problems and shortcomings, and it is therefore an object of the invention to provide an analyzing apparatus that is capable of reliably distinguishing factors of sound generation and places thereof. Also, it is an object of the invention to provide an analyzing apparatus that is capable of reliably distinguishing factors of vibration generation even if vibrations are measured instead of sounds.

DISCLOSURE OF THE INVENTION

In order to solve the problems described above, the invention is an acoustic vibration analyzing apparatus capable of carrying out analysis of acoustic vibrations by picking up data of sounds or vibrations generated due to rotation of a plurality of rotating bodies and data of the number of revolutions of a rotating body selected from the plurality of rotating bodies when a power transmission mechanism of a vehicle having the plurality of rotating bodies operates; comprising: frequency analyzing means of calculating data of frequencies of the plurality of rotating bodies by analyzing the frequencies of the data of the sounds or vibration; order converting means of calculating orders in response to specifications of the plurality of rotating bodies based on data of frequencies of the plurality of rotating bodies; speed converting means of calculating a speed of the vehicle based on data of the number of revolutions of the plurality of rotating bodies; and means of displaying acoustic pressure levels acquired based on the data of the sounds or vibrations in a manner corresponding to the orders and the vehicle speed.

In the acoustic vibration analyzing apparatus of the invention, when sounds and vibrations are generated from a plurality of rotating bodies equipped in a power transmission mechanism of a vehicle, the acoustic vibration analyzing apparatus picks up data of the sounds and vibrations, and calculates orders of variables not depending on the numbers of revolutions of the respective rotating bodies. Also, the apparatus calculates the vehicle speeds based on the data of the numbers of revolutions of a rotating body selected from a plurality of rotating bodies. Also, the acoustic pressure levels acquired based on the data of sounds or vibrations are displayed by the displaying means corresponding to the previously calculated orders and vehicle speed. For example, since the order of sounds generated from a rotating body is determined by the number of teeth of a rotating body, a rotating body which is a source of generation of sounds can be identified by investigating the order corresponding to the sounds.

In accordance with the acoustic vibration analyzing apparatus of the invention, since the order of sounds or vibrations is calculated, and the acoustic pressure level corresponding to the calculated order and the vehicle speed is displayed, it becomes possible to identify a source of generation of abnormal sounds and vibrations that are generated in response to changes in the vehicle speed. Further, since matching with sensory inspection can be easily carried out, it becomes easy to check generation of abnormal sounds and vibrations and to identify the source of generation thereof. In addition, since the source of generation of abnormal sounds and vibrations can be reliably identified, this contributes to reducing the number of processes of replacement work. Since the source of generation of abnormal sounds and vibrations can be identified by the order without dependency on the number of revolutions of a rotating body, the source of generation of abnormal sounds and vibrations can be controlled and distinguished even with a plurality of rotating bodies having approximately equal frequencies.

It is preferable that the acoustic vibration analyzing apparatus of the invention be provided with means of reproducing sounds having a specified order selected based on display by the displaying means. Sounds having the specified order are reproduced, and are compared by a worker with the sounds that the worker heard during sensory inspection, and it becomes easy to identify the source of generation of sounds.

In accordance with the acoustic vibration analyzing apparatus of the invention, since it is made easy to secure matching with sensory inspection by reproducing sounds having a specified order, it is possible to easily confirm generation of sounds and vibrations and to easily identify the source of generation thereof.

It is preferable that, in the acoustic vibration analyzing apparatus according to the invention, the reproducing means selectively reproduces any one of original sounds consisting of the above-described sounds or vibrations, sounds having the specified order, and sounds obtained by excluding the components of the sounds having the specified order from the above-described original sounds. The original sounds are almost the same as the sounds that a vehicle or a power transmission mechanism emits when measurement is carried out, and the sounds having the specified order correspond to abnormal sounds generated from the power transmission mechanism. The sounds obtained by excluding the components of the sounds having the specified order from the original sounds are almost the same as those that a vehicle or a power transmission mechanism emits after the source of generation of abnormal sounds is excluded. Therefore, when hearing and comparing the respective sounds to each other, it becomes easy to identify the source of generation of abnormal sounds.

In accordance with the acoustic vibration analyzing apparatus of the invention, it is possible to reproduce original sounds consisting of taken-in sounds or vibrations, sounds having a specified order, and sounds obtained by excluding specified components from the original sounds. Therefore, since it becomes possible to reproduce a state of measurement, to hear only abnormal sounds, and to check a state in which the abnormal sounds are eliminated, it becomes easy to confirm further generation of abnormal sounds and vibrations and to identify the source of generation in addition to the above-described effects.

It is preferable that the acoustic vibration analyzing apparatus of the invention be provided with means of converting data of sounds reproduced by the reproducing means into a file of a predetermined data format.

In accordance with the acoustic vibration analyzing apparatus of the invention, since it becomes possible to store data of sounds reproduced by the acoustic vibration analyzing apparatus by converting the same into a file format which can be read by other apparatuses, it is possible to check for abnormal sounds, etc., by using another apparatus. Therefore, since it becomes possible to check for generation of abnormal sounds and vibrations and to identify the source of generation thereof regardless of place and time, it becomes easy to take countermeasures against such abnormal sounds and vibrations.

The present invention provides a method of analyzing acoustic vibrations by picking up data of sounds or vibrations that are generated due to rotation of a plurality of rotating bodies and data of the number of revolutions of a rotating body selected from the plurality of rotating bodies when a power transmission mechanism of a vehicle having the plurality of rotating bodies operates. The method comprises: a frequency-analyzing step of calculating frequencies of the plurality of rotating bodies by analyzing frequencies of the data of the sounds or vibrations; an order converting step of calculating an order responsive to specifications of the plurality of rotating bodies based on data of frequencies of the plurality of rotating bodies; a speed-converting step of calculating speeds of the vehicle based on data of numbers of revolutions of the rotating bodies; and a displaying step of displaying acoustic pressure levels acquired based on the data of the sounds or vibrations in a manner corresponding to the order and vehicle speed.

In the acoustic vibration analyzing method according to the invention, when sounds and vibrations are generated from a plurality of rotating bodies equipped in a power transmission mechanism of a vehicle, orders corresponding to the sounds or vibrations are calculated, and the acoustic pressure levels acquired based on the sounds or vibrations are displayed by the displaying means corresponding to the previously calculated orders and vehicle speeds. For example, since the order of sounds generated from a rotating body is determined by the number of teeth of the rotating body, the rotating body which is the source of generation of the sounds can be identified if the order corresponding to the sounds is investigated.

In accordance with the acoustic vibration analyzing method of the invention, since the order of sounds or vibrations is calculated based on the data measured, and the acoustic pressure level corresponding to the calculated order and vehicle speed is displayed, it becomes possible to identify the source of generation of sounds and vibrations that are generated in response to changes in the vehicle speed. Therefore, since the source of generation of abnormal sounds and vibrations can be easily and reliably identified, it is possible to reduce the frequency (number of processes) for replacement work and adjustment work for parts, etc.

It is preferable that the acoustic vibration analyzing method according to the invention have a reproducing step of reproducing sounds when reproduction of sounds having a specified order is selected based on display made in the displaying step. By selecting a specified order and reproducing the sounds having the specified order, an operator can compare the sounds with the sounds that he actually heard during sensory inspection, and it becomes easy to identify the source of generation of the sounds.

In the acoustic vibration analyzing method of the invention, it is preferable that the reproducing step involves selectively reproducing any one of the original sounds consisting of the sounds or vibrations, sounds having the above-described specified order, and sounds obtained by excluding sounds having the specified order from the original sounds. The original sounds are almost the same as the sounds that a vehicle or a power transmission mechanism emits when measurement is carried out, and the sounds having the specified order correspond to abnormal sounds generated by the power transmission mechanism. The sounds obtained by excluding the components of the sounds having the specified order from the original sounds are almost the same as those that a vehicle or a power transmission mechanism emits after the source of generation of abnormal sounds is excluded. Therefore, when hearing and comparing the respective sounds to each other, it becomes easy to identify the source of generation of sounds.

In accordance with the acoustic vibration analyzing method of the invention, since the original sounds, specified components, and sounds obtained by excluding the specified components from the original sounds can be selectively reproduced, it becomes possible to reproduce a state of measurement is carried out, to hear only the abnormal sounds, and to check a state in which the source of generation of abnormal sounds is excluded. Therefore, it becomes further easier to check for generation of abnormal sounds and vibrations and to identify the source of generation thereof.

The invention provides an acoustic vibration analyzing program by which acoustic vibration analysis is carried out by causing data of sounds or vibrations generated due to rotation of a plurality of rotating bodies and data of a number of revolutions of a rotating body selected from the plurality of rotating bodies picked up by a computer when a power transmission mechanism of a vehicle having the plurality of rotating bodies operates. The program comprises: a frequency-analyzing step of calculating the frequencies of the plurality of rotating bodies by analyzing frequencies of the data of the sounds or vibrations; an order converting step of calculating an order responsive to specifications of the plurality of rotating bodies based on data of the frequencies of the plurality of rotating bodies; a speed-converting step of calculating speeds of the vehicle based on data of the numbers of revolutions of the rotating bodies; and a displaying step of displaying acoustic pressure levels acquired based on the data of the sounds or vibrations in a manner corresponding to the order and vehicle speed.

If the acoustic vibration analyzing program of the invention is read by a computer and is executed, orders corresponding to sounds and vibrations generated by a plurality of rotating bodies equipped in a power transmission mechanism of a vehicle are calculated, and acoustic pressure levels acquired based on the sounds or vibrations are displayed by the displaying means corresponding to the previously calculated orders and vehicle speeds. For example, since the order of the sounds generated from a rotating body is determined by the number of teeth of the rotating body, the rotating body that is the source of generation of the sounds can be identified if the order corresponding to the sounds is investigated.

In accordance with the acoustic vibration analyzing program of the invention, by only executing the acoustic vibration analyzing program recorded on a recording medium, acoustic vibration analysis can be carried out, and it is possible to identify the source of generation of abnormal sounds and vibrations.

The invention provides a recording medium readable by a computer, by which an acoustic vibration analysis is carried out by causing data of sounds or vibrations generated due to rotations of a plurality of rotating bodies and data of a number of revolutions of a rotating body selected from the plurality of rotating bodies picked up by a computer when a power transmission mechanism of a vehicle having the plurality of rotating bodies operates. The recording medium stores a program comprising: a frequency-analyzing step of calculating frequencies of the plurality of rotating bodies by analyzing frequencies of the data of the sounds or vibrations; an order converting step of calculating an order responsive to specifications of the plurality of rotating bodies based on data of the frequencies of the plurality of rotating bodies; a speed-converting step of calculating speeds of the vehicle based on data of the numbers of revolutions of the rotating bodies; and a displaying step of displaying acoustic pressure levels acquired based on the data of the sounds or vibrations in a manner corresponding to the order and vehicle speed.

If the acoustic vibration analyzing program recorded on a recording medium readable by a computer of the invention is read by a computer and is executed, orders corresponding to sounds and vibrations generated by a plurality of rotating bodies equipped in a power transmission mechanism of a vehicle are calculated, and acoustic pressure levels acquired based on the sounds or vibrations are displayed by the displaying means corresponding to the previously calculated orders and vehicle speeds. For example, since the order of the sounds generated from a rotating body is determined by the number of teeth of the rotating body, the rotating body that is the source of generation of the sounds can be identified if the order corresponding to the sounds is investigated. Also, such an acoustic vibration analyzing program may be stored in advance in a computer or may be downloaded through a network.

With the recording medium readable by a computer of the invention, by only causing the acoustic vibration analyzing program to be executed by a computer, acoustic vibration analysis can be carried out, and it is possible to identify the source of generation of abnormal sounds and vibrations.

BEST MODE FOR CARRYING OUT THE INVENTION

A detailed description is given of an embodiment of the invention with reference to the drawings.

Figure 1:
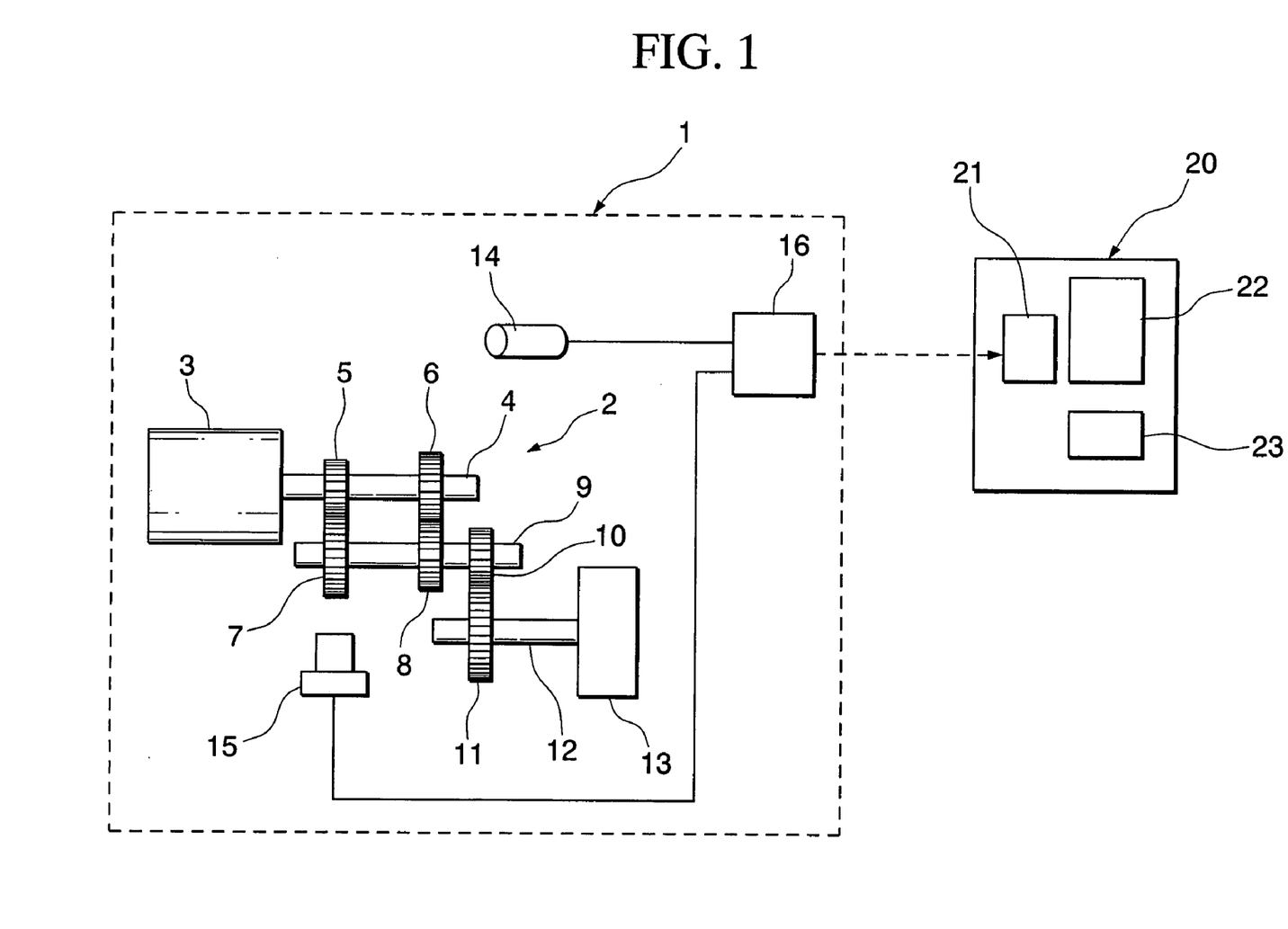
FIG. 1 is a conceptual view showing measurement of abnormal sounds by means of an acoustic vibration analyzing apparatus according to the invention.

First, a description is given of an object to be inspected according to the embodiment. As depicted in FIG. 1, the object to be inspected by the embodiment is a vehicle 1, in further detail, a transmission 2 of the vehicle.

The transmission 2 has a first shaft 4 driven and rotated by using an engine 3 as a drive source. A first-speed drive gear 5 having ten teeth and a second-speed drive gear 6 having fifteen teeth are attached to the first shaft 4 in parallel. A first-speed driven gear (rotating body) 7 having twenty teeth is engaged with the first-speed drive gear 5, and a second-speed driven gear 8 having five teeth is engaged with the second-speed drive gear 6. Both of the first-speed driven gear 7 and the second-speed driven gear 8 are attached to a second shaft 9.

A final drive gear 10 having ten teeth is attached to the second shaft 9. The final drive gear 10 is engaged with a final driven gear 11. The final driven gear 11 is attached to a third shaft 12. A drive wheel 13 is attached to the end part of the third shaft 12. The second shaft 9 and the third shaft 12 are disposed in parallel to the first shaft 4.

A clutch (not illustrated) is provided at the first-speed driven gear 7 and the second-speed driven gear 8. When the first speed is selected by a shift lever (not illustrated), the clutch of the second-speed driven gear 8 is disengaged, and the second-speed driven gear 8 rotates idly, and revolution of the engine 3 is transmitted to the third shaft 12 and the drive wheel 13 via the first-speed drive gear 5, the first-speed driven gear 7, and the final drive gear 10. Similarly, when the second speed is selected, the clutch of the first-speed driven gear 7 is disengaged, the first-speed driven gear 7 rotates idly, and revolution of the engine 3 is transmitted to the third shaft 12 and the drive wheel 13 via the second-speed drive gear 6, the second-speed driven gear 8 and the final drive gear 10.

A sound-collecting microphone 14 for picking up sounds generated by the transmission 2 and sounds generated from the engine 3 and other devices and a recorder 16 for recording sounds picked up by the sound-collecting microphone 14 are incorporated into the passenger compartment of the vehicle 1. Since a test driver who carries out sensory inspection by actually running the vehicle 1 speaks about what he senses while driving, his voice is also picked up by the sound-collecting microphone 14. The recorder 16 records the sounds picked up by the sound-collecting microphone 14 according to the elapsed time as acoustic data.

Sounds generated by the transmission 2 are diverse, and for example, there are sounds generated due to rotation of the respective shafts 4 and 9 and respective gears 5, 6, 7, 8, 10, and 11, and sounds generated due to engagement of the gears. Sounds that exceed a predetermined acoustic pressure level (dB) among these sounds are regarded as the above-described abnormal sounds.

A pulse sensor 15 is attached at a position facing the teeth of the first-speed driven gear 7 attached to the second shaft 9. The pulse sensor 15 is a semiconductor sensor for detecting the number of revolutions of the first-speed driven gear 7 selected to detect the number of revolutions of the second shaft 9. The pulse sensor 15 outputs rectangular pulse signals when the first-speed driven gear 7 rotates, and individual teeth formed on the outer edge thereof approach or withdraw from the pulse sensor 15. The pulse signals outputted from the pulse sensor 15 are recorded by the recorder 16 as pulse signal data according to elapsed time from commencement of inspection. The recorder 16 synchronizes the acoustic data with the pulse signal data and records the same on a recording medium as a single data file.

Further, a description is given of the orders responsive to the specifications of the respective gears 7, 8, and 10 of the transmission 2.

The orders of the respective gears 7, 8, and 10 are parameters for specifying the number of teeth of respective gears (the first-speed driven gear 7, the second-speed driven gear 8 and the final drive gear 10) on the basis of a single revolution of the second shaft 9 (to which the first-speed driven gear 7 for detecting the number of revolutions by the pulse sensor 15 is attached). As described above, since the first-speed driven gear 7 is a gear having twenty teeth, if pulses are outputted twenty times from the pulse sensor 15, the second shaft 9 has reached one revolution. That is, when the second shaft 9 rotates one time, the first-speed driven gear 7 is engaged with the first-speed drive gear 5 by means of twenty teeth, and then the first-speed driven gear 7 is regarded as having a twentieth order. Similarly, when the second shaft 9 rotates one time, the second-speed driven gear 8 is engaged with the second-speed drive gear 6 by means of five teeth, and then the second-speed driven gear 8 is regarded as having a fifth order. Further, since the final drive gear 10 is engaged with the final driven gear 11 by means of ten teeth when the second shaft 9 rotates one time, and then the final driven gear 10 is regarded as having a tenth order.

When the frequency is made into a parameter, for example, if the second shaft 9 rotates 100 times per second, the first-speed driven gear 7 having twenty teeth is engaged with the first-speed drive gear 5 while it rotates at 100 times per second, and since the pulse sensor 15 outputs pulses 2000 times per second, at this time, the frequency becomes 2000 Hz. If the number of revolutions of the second shaft 9 is 50 times per second, the frequency of the first-speed driven gear 7 becomes 1000 Hz. Thus, although the frequency changes in response to the number of revolutions, the order thereof is constant, not dependent on the number of revolutions of the shaft. Accordingly, if data is processed while paying attention to the order as in this embodiment, consistent analysis can be achieved without regard to the number of revolutions.

Figure 2:
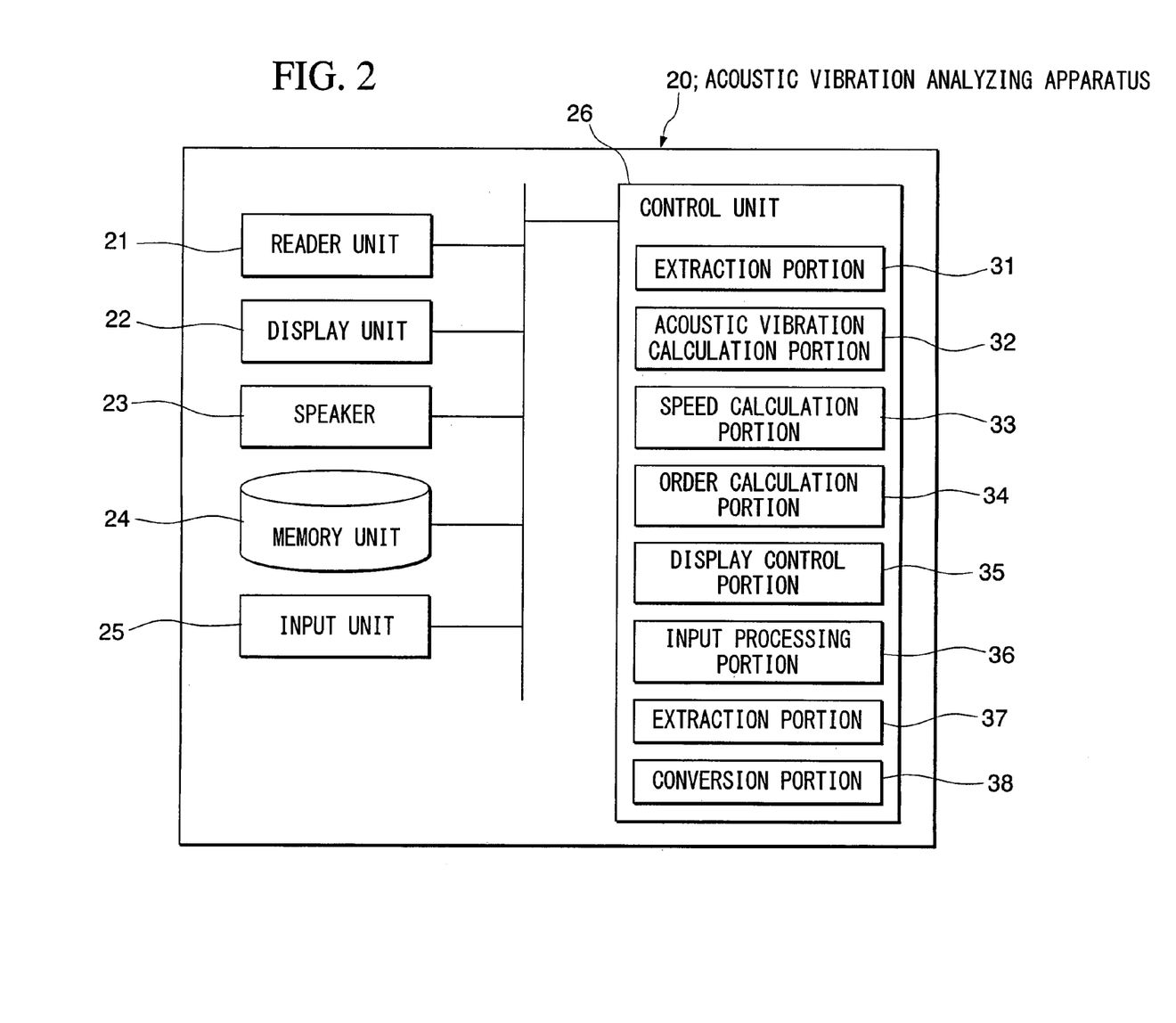
FIG. 2 is a block diagram depicting a configuration of the acoustic vibration analyzing apparatus.

As depicted in FIG. 1 and FIG. 2, the acoustic vibration analyzing apparatus 20 is a computer comprising a reader unit 21 for reading data files from a recording medium, a display unit 22 such as a display, a speaker 23 for reproducing sounds and voices, a memory unit 24 for storing data, an input unit 25 such as a keyboard and a pointing device, and a control unit 26 such as a central processing unit. The acoustic vibration analyzing apparatus 20 may include a plurality of reader units 21 in compliance with types of recording media. The speaker 23 includes an amplification circuit for amplifying digital signals and a converter for converting the same to analog signals, and so on.

The control unit 26 having a central processing unit and a memory starts application programs for acoustic vibration analyses, which are stored in the memory unit 24, whereby various types of data processes are carried out.

Herein, the control unit 26 functions as an extraction portion 31, an acoustic vibration calculation portion 32, a speed calculation portion 33, an order calculation portion 34, a display control portion 35, an input processing portion 36, and an extraction portion 37 based on application programs for acoustic vibration analysis.

The extraction portion 31 extracts acoustic data and pulse signal data from read data files. The acoustic data and pulse signal data thus extracted are converted to frequency data and acoustic pressure data by the acoustic vibration calculation portion 32. Herein, the frequency data is obtained by analyzing (fast Fourier transforming) the acoustic data in terms of frequency. The acoustic pressure data is created by acquiring the acoustic pressure based on the size in amplitude of sounds of the frequency data and by calculating the acoustic pressure level which is a logarithm ratio in terms of the reference acoustic pressure (for example, the acoustic pressure of the entire sounds). The acoustic pressure data has a data configuration in which time/frequency and the number of revolutions of the second shaft 9 are associated with the acoustic pressure levels of sounds identified thereby.

In addition, the pulse signal data is converted into the number of revolutions and the vehicle speed by the speed calculation portion 33. Although the vehicle speed can be obtained by multiplying the number of revolutions by a predetermined coefficient, the coefficient differs according to the diameter of the drive wheel 13 and gear ratio. In the acoustic vibration analyzing apparatus 20, a coefficient that is stored in memory in advance or a value inputted by an operator may be employed.

The order calculation portion 34 calculates an order by dividing the frequency of the sounds from the frequency data and pulse signal data by the number of revolutions. The order obtained by the processing is associated with time, frequency, acoustic pressure level, number of revolutions of the second shaft 9, and speed of the vehicle 1, and is made into order data. Thus, the orders calculated from the actually recorded sounds are equivalent to those inherent to the respective gears, which are determined by the number of teeth (specifications) of the respective gears (for example, gears 7, 8, and 10) of the transmission 2. Therefore, by calculating the order of the sounds, exceeding a predetermined acoustic pressure level, of the sounds recorded while running, it is possible to identify a gear (for example, gear 7, 8, or 10) which may be the cause of generation of abnormal sounds. Also, the order data may be a data configuration in which the frequency and number of revolutions and the orders thereby identified are associated with each other.

A display process of the results of calculation is carried out by the display control portion 35. The input processing portion 36 processes operations inputted by an operator using the input unit 25. The extraction portion 37 carries out a process of extracting corresponding sounds from the order data when sounds having a specified frequency or order are reproduced. A conversion portion 38 converts data of sounds extracted by the extraction portion 37 and reproduced by the speaker 23 into a file format that is readable by another unit. Herein, "readable" means that a file can be opened by another unit, data can be displayed on a display, and sounds can be reproduced by a speaker of another unit.

Next, a description is given of operation of the embodiment.

First, the vehicle 1 is actually run, and acoustic data and pulse signal data are acquired. At this time, a test driver carries out sensory inspection while gradually changing the vehicle speed, and records a running feeling that the test driver actually senses. Voice data or a paper medium may be used as a recording medium on which the results of the sensory inspection are recorded. For example, if the test driver hears an abnormal sound when the vehicle speed is around 55 km/h and 60 km/h when gradually accelerating the speed in 2nd gear, the point is recorded using the recorder 16 or on a paper medium. A recording medium is taken out from the recorder 16 after the actual running is finished. In the acoustic vibration analyzing apparatus 20, a process is carried out in compliance with the flowchart of FIG. 3. That is, a data file recorded by the recording medium is read by the reader unit 21 (Step S1), and the frequency is analyzed by the acoustic vibration calculation portion 32 (Step S2). Next, the number of revolutions of the transmission 2 of the vehicle 1 is converted into the vehicle speed by the speed calculation portion 33 as necessary (Step S3). After that, the order conversion is carried out in compliance with the specifications of the respective gears 7, 8, and 10 by the order calculation portion 34 in response to an operation by an operator (Step S4). The results of the calculations are displayed on the display unit 22 by the display control portion 35 (Step S5). Further, acoustic data is reproduced based on the results of calculations (Step S6). Still further, data conversion is carried out by the conversion portion 38 as necessary (Step S6), and the data is converted into a format that can be read by another computer (Step S7).

Hereinafter, a description is given of one example of the screens prepared by the acoustic vibration analyzing apparatus 20 and operation of the screens when actually carrying out the processes of respective steps S1 through S7.

Figure 4:
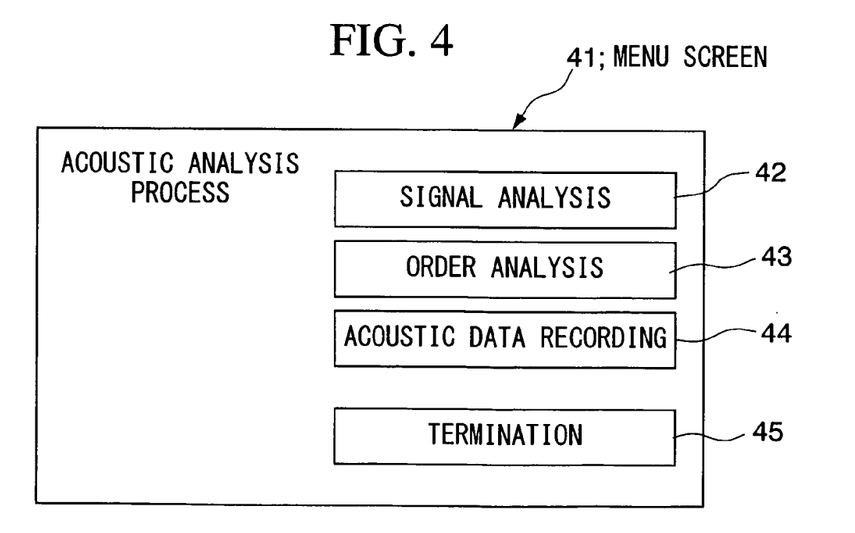
FIG. 4 is a view depicting a menu screen.

When an application program for acoustic vibration analyses of the acoustic vibration analyzing apparatus 20 is started, a menu screen for selecting various types of processes and a screen for assisting a process selected on the menu screen and displaying the result of the process are displayed on the display unit 22. One example of the menu screen is depicted in FIG. 4. On the menu screen 41, a data file is read, and respective data is displayed. In addition, the menu screen 41 is provided with a signal analysis button 42 to be selected when carrying out frequency analysis of acoustic data, an order analysis button 43 to be selected when carrying out order analysis, an acoustic data recording button 44 for recording a data file read from a recording medium in a universal format, and preparing a data file for frequency analysis, and a termination button 45 for terminating the application program. Also, an operator inputs and operates, using a keyboard or a pointing device, for operation of the buttons, selection of icons, inputting characters or numerals in a text box, and movement of a cursor. Also, the result of input and result of operation are reflected in various types of processes, display of screens, or acoustic output via the input processing portion 36.

Figure 5:
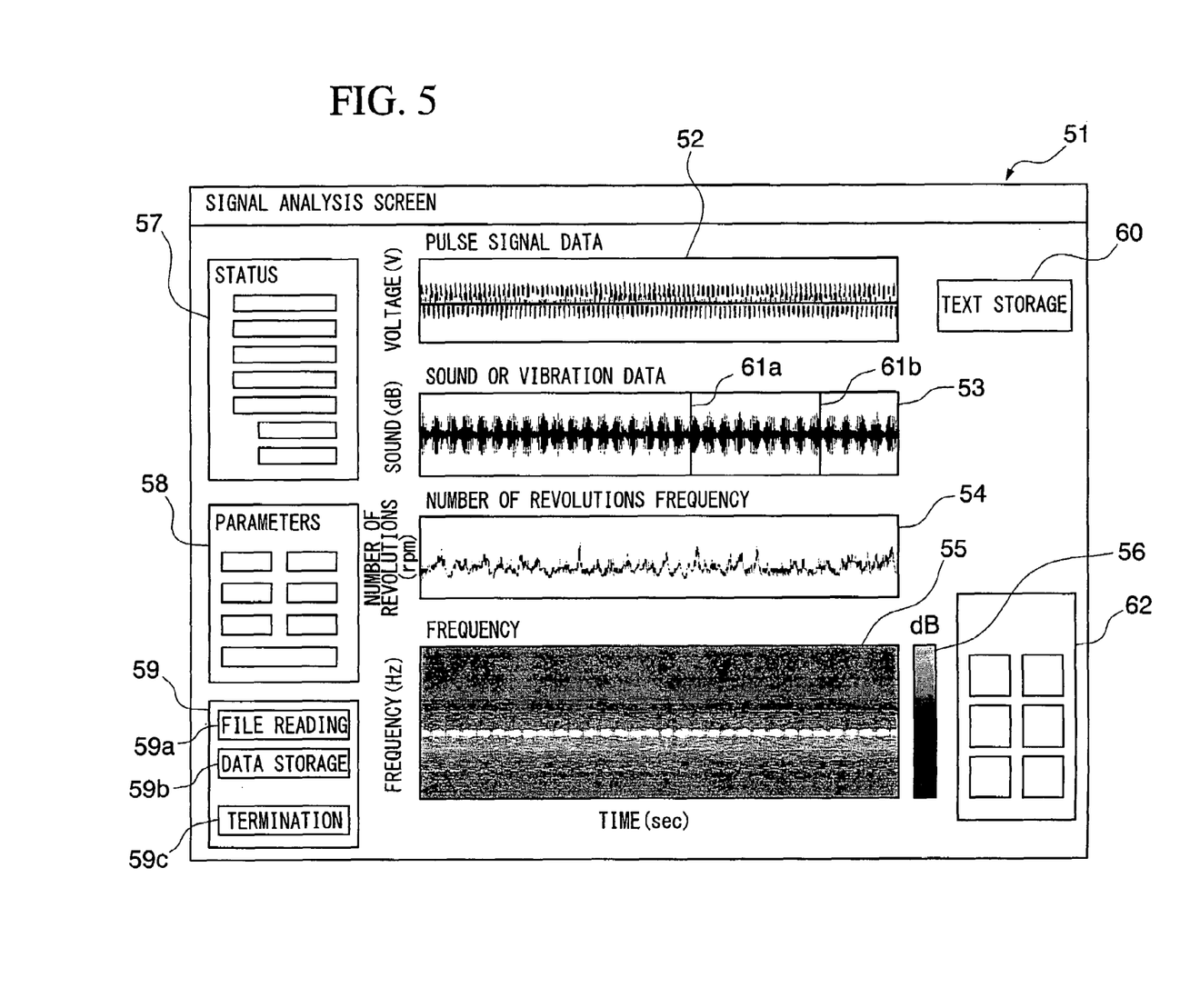
FIG. 5 is a view depicting a signal analysis screen.

When the signal analysis button 42 is selected on the menu screen 41, a signal analysis screen 51 as depicted in FIG. 5 is displayed, and it becomes possible to read a file, display a graph, and record data.

As depicted in FIG. 5, at the middle part of the signal analysis screen 51, a pulse signal data graph 52 on which pulse signals (voltage) outputted from the pulse sensor 15 are displayed with elapsed time of inspection as the horizontal axis, an acoustic graph 53 showing change in sounds (voltage), a graph 54 of the number of revolutions showing change in the number of revolutions per minute (rpm) of the second shaft 9, a frequency graph 55 showing change in the frequency (Hz) obtained by analyzing the frequencies of acoustic data, and a frequency graph 55 on which the frequencies of sounds recorded in the recorder 16 are plotted in terms of change of the time of actual running are provided. In these graphs, the axis of time is the horizontal axis, the pulse signal data graph 52 is arranged at the uppermost part of the signal analysis screen 51, and the remaining graphs are arranged in the order listed above from top to bottom. Further, these graphs are disposed so that the axes of time thereof are coincident with each other. Respective plots of the frequency graph 55 are classified by colors in compliance with the degree of the acoustic level (dB) calculated by the acoustic vibration calculation portion 32. That is, the frequency graph 55 depicts the time elapsed from commencement of inspection, frequency of the sound generated at that time, and the acoustic pressure level (sound color). Black and dark blue are assigned to lower acoustic pressure levels, and colors with increasing brightness, such as blue, red, and yellow are assigned according to increase in the acoustic pressure level. Also, white is assigned to the area where the acoustic pressure level is highest. The relationship between the degrees of the acoustic pressure levels and the assigned colors can be checked using a scale 56 disposed at the right side of the frequency graph 55.

In addition, it is assumed that the axes of the graphs 52, 53, 54, and 55 and the scale 56 are provided with numerals (not illustrated) (the same in the respective graphs).

A status area 57 for displaying status data, a parameter area 58 for setting parameters for forming graphs, and an area 59 for management of files and screens are disposed at the left side of the signal analysis screen 51 with the status area 57 placed at the uppermost part thereof in the above order.

Items displayed in the status area 57 includes information (for example, "now reading," "now processing," "standby," "now saving," etc.) showing the present process, a file name attached to a data file, date of measurement, name of person in charge of measurement, his comments, a sample rate of acoustic data and pulse signal data, and number of selected data.

Using the parameter area 58, it is possible to select whether a trigger for plotting a signal included in acquired data is actuated at the timing of a signal rise or signal fall, to set or select whether the time to form a graph is determined at the point of commencement or the point of termination, and to set or select the minimum value and maximum value of the frequencies.

A file read button 59a for executing reading of a file is disposed in an area 59 for management of files and screens, and a data storage button 59b for provisionally storing data displayed in the form of a graph in the storage unit 24 in order to analyze the data in terms of frequency is provided below the file read button 59a. Further below the file read button 59a, a termination button 59c for closing the signal analysis screen 51 is disposed. The reason why the clearance between the termination button 59c and the data storage button 59b is made larger than the clearance between the file read button 59a and the data storage button 59b is to prevent erroneous operations of the respective buttons 59a, 59b, and 59c. In view of preventing erroneous operations, it is preferable that the color and size of the respective buttons 59a, 59b, and 59c be made different from each other (hereinafter, this is the same for the other termination buttons).

A text storage button 60 is disposed at the right upper part of the signal analysis screen 51, and executes storage of pulse signal data and acoustic data that are displayed in the pulse signal data graph 52. The data is stored in text format, and the range for storing the data may be set by using the start point cursor 61a and the termination point cursor 61b with the time as a parameter.

A tool area 62 in which icons are arranged is disposed at the right lower part of the signal analysis screen 51. Icons are displayed in this area, which have functions of altering the pattern of graph display and enlarging or reducing the graph display. Also, alteration of the display pattern of graphs can be achieved by combined use of the input processing portion 36 and the display control portion 35.

Figure 3:
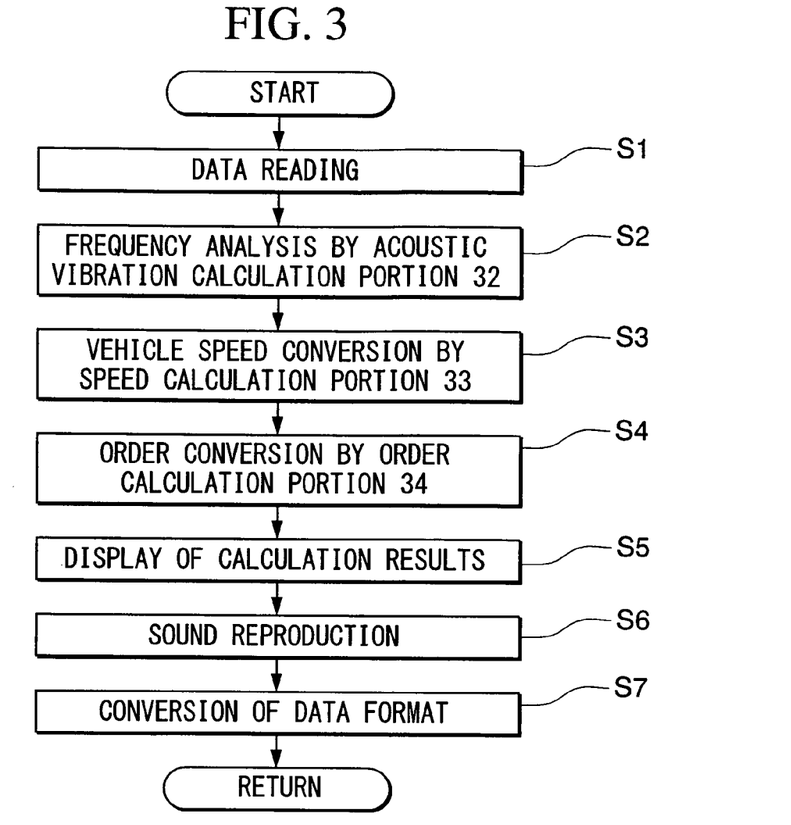
FIG. 3 is a flowchart depicting processes of the acoustic vibration analyzing apparatus.

The data file prepared by selecting the acoustic data record button 44 (refer to FIG. 4) is read when the file read button 59a is selected (Step S1 of FIG. 3). Pulse signal data and acoustic data are extracted by the extraction portion 31 from the read data files, the pulse signal data graph 52 is displayed based on the pulse signal data, and the sound graph 53 is displayed based on the acoustic data. Further, the speed calculation portion 33 calculates the number of revolutions based on the pulse signal data, and the result of the calculation is displayed in the number-of-revolutions graph 54. Also, the frequency is analyzed based on the frequency and acoustic pressure level calculated from the acoustic data (Step S2 of FIG. 3). The result thereof is displayed on the frequency graph 55. If the data storage button 59b is selected after moving the cursors 61a and 61b in the tool area 62 as necessary and changing the scale of the time axis, the order analysis data (frequency data) is stored in a file. After the data storage is terminated, the termination button 59c is selected to terminate the signal analysis screen 51.

Figure 6:
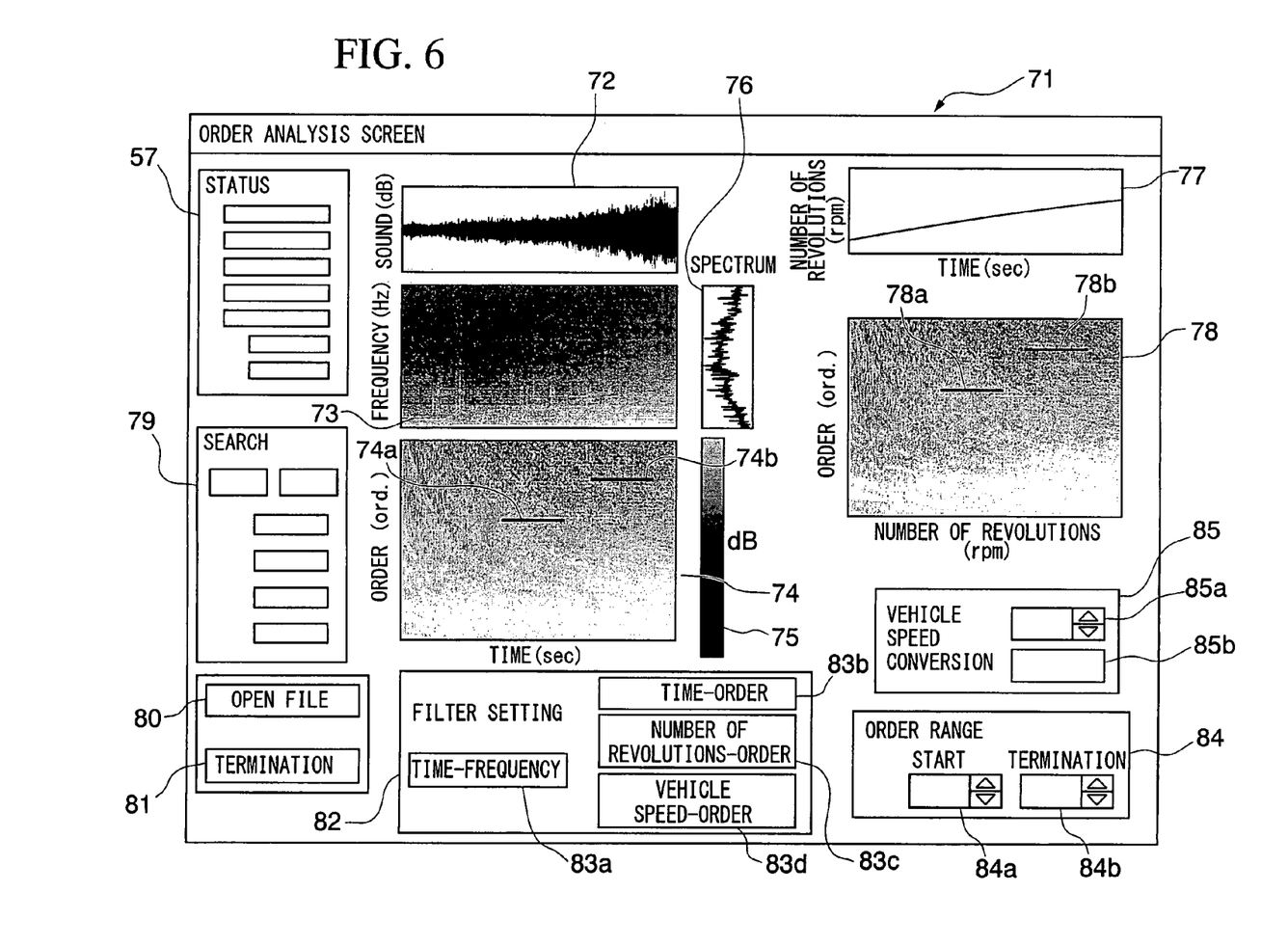
FIG. 6 is a view depicting an order analysis screen.

After the signal analysis screen 51 is terminated, the order analysis button 43 is selected from the menu screen 41 depicted in FIG. 4, and an order analysis screen 71 is displayed as depicted in FIG. 6, thereby enabling order analysis such as reading of the file, graph display, and setting of filters.

As depicted in FIG. 6, a sound graph 72 showing change in sound with respect to elapse of time, a frequency graph 73 showing change in acoustic frequency, and an order graph 74 showing change in orders obtained by the order analysis are provided at the middle part of the order analysis screen 71. These graphs are disposed with the time axis as the horizontal axis in the above order, and the acoustic graph 72 is placed at the uppermost part thereof. Further, the axes of time of the respective graphs are made coincident with each other. Respective plots of the frequency graph 73 and the order graph 74 are classified by colors in compliance with the degree of the acoustic pressure level. The relationship of the degree of the acoustic pressure levels with the colors can be checked using a scale 75 disposed at the right side of the graph 74 (hereinafter, this is the same for the respective graphs).

Also, a graph 76 for displaying the frequency in terms of spectrum is disposed at the right side of the frequency graph 73. The order graph 74 is displayed in such a manner that it is displayed with brighter colors in areas of a lower order (the acoustic pressure level is higher), and with darker colors in areas of a higher order (the acoustic pressure level is lower). At the middle part of the order graph 74, a portion 74a (depicted with a black line in FIG. 6) whose color is brighter than in the other peripheral areas is displayed. Also, at the right upper part of the order graph 74, a portion 74b (depicted with a black line in FIG. 6) whose color is brighter than in the other peripheral areas is displayed. These portions 74a and 74b show that abnormal sounds being generated.

In addition, a number-of-revolutions graph 77 showing change in the number of revolutions with the elapse of time is disposed at the right upper part of the order analysis screen 71. An order graph 78 showing changes in the order (vertical axis) with respect to the number of revolutions (horizontal axis) is disposed downward of the number-of-revolutions graph 77. The data of the order graph 78 is classified and plotted with colors assigned to the degree of the acoustic pressure level in compliance with the above-described scale 75. The order graph 78 is displayed with brighter colors in areas of smaller order (the acoustic pressure level is higher), and with darker colors in areas of higher order (the acoustic pressure level is lower). At the middle part of the order graph 78, a brighter portion 78a (depicted with a black line in FIG. 6) than in the other peripheral areas is displayed, and at the right upper part of the order graph 78, a brighter portion 78b (depicted with a black line in FIG. 6) than in the other peripheral areas is displayed. These portions 78a and 78b show that abnormal sounds being generated.

At the left upper part of the order analysis screen 71, a status area 57 is disposed as in the signal analysis screen 51. Downward thereof, a search area 79 is disposed, which displays coordinate information of plots of the respective graphs 72, 73, 74, 77, and 78. When a specified point on a graph is pointed at a pointing device, etc., values of the frequency, order, number of revolutions, and vehicle speed are displayed in the respective display columns of the search area 79 in compliance with the ordinate and abscissa of the graph. In addition, a button 80 for executing reading of data to be displayed in the screen and a button 81 for terminating the screen are disposed at the left lower part of the order analysis screen 71.

In the section from the lower middle part to the right part of the order analysis screen 71, a filter setting area 82 for processing data using filters, an order range area 84 for setting the range of orders displayed in the order analysis screen 71, and a vehicle speed conversion area 85 for converting the number of revolutions into the vehicle speed are disposed.

In the filter setting area 82, it is possible to set parameters for carrying out a filter process and to set the horizontal and vertical axes of a graph for displaying the filter-processed data. When a time-frequency button 83*a* is selected, the frequency component is processed using filters as parameters, and changes in frequency over time are displayed in the form of a graph. When a time-order button 83*b* is selected, the order component is processed using filters as parameters, and changes in order over time are displayed in the form of a graph. When the number of revolutions-order button 83*c* is selected, the order component is processed using filters as parameters, and changes in order against number of revolutions are displayed in the form of a graph. And, when a vehicle speed-order button 83*d* is selected, the order component is processed using filters as parameters, and changes in order against the vehicle speed are displayed in the form of a graph.

In the order range area 84, it is possible to select the range of the order to be displayed in the order analysis screen 71 using the start value and the end value. An increase button for increasing a numerical value in the text box and a decrease button for decreasing a numerical value in the text box are disposed next to a text box, in which a numerical value can be inputted, in the start column 84*a* in which a start value is inputted. Similarly, an increase button of a numerical value and a decrease button thereof are disposed next to a text box, in which a numerical value can be inputted, in the termination column 84*b* in which an end value is inputted.

In the vehicle speed conversion area 85, a setting column 85*a* for setting a coefficient used for conversion of the vehicle speed and an execution button 85*b* used for converting the speed of the vehicle 1 based on the set coefficient and number of revolutions are provided. In the setting column 85*a*, an increase button of a numerical value and a decrease button thereof are disposed next to a text box in which a coefficient is inputted. The coefficient set in the setting column 85*a* is a value obtained by multiplying the ratio of the number of revolutions of the second shaft 9, which is detected by the pulse sensor 15, to the number of revolutions of the drive wheel 13 by the circumference of the drive wheel 13. Herein, the circumference of the drive wheel 13 can be obtained by multiplying twice the radius of the drive wheel 13 by pi. The reason why such a coefficient is established is that, even if a vehicle runs without gear change (shifting) in running, there may be cases in which the numbers of revolutions of the respective shafts 4 and 9 are not coincident with the number of revolutions of the drive wheel 13 due to the number of respective shafts 4 and 9 of the transmission 2 and other reduction gear trains (not illustrated). In addition, since such the coefficient differs vehicle by vehicle, it is preferable that the coefficient can be adequately set by an operator. Also, the number of revolutions at which the drive wheel 13 actually rotates is proportionate to the speed of the vehicle 1.

When the button 80 is selected in the order analysis screen 71, the acoustic graph 72, frequency graph 73 and frequency spectral graph 76 are displayed by the display control portion 35 based on the data of files stored in the signal analysis screen 51 (refer to FIG. 5). Further, the number of revolutions in terms of time change is calculated based on the pulse signal data and is displayed on the graph 77. Still further, the order of sounds is calculated by the order calculation portion 34 based on the frequency data (Step S4 of FIG. 3). The result of calculation is displayed on the order graphs 74 and 78 by the display control portion 35 (Step S5 of FIG. 3). When the result of the process is displayed with the vehicle speed as the horizontal axis, a coefficient is set in the vehicle speed conversion area 85, and the number of revolutions of the second shaft 9 is converted into the vehicle speed (Step S3 of FIG. 3). At this time, the vehicle speed is calculated by the speed calculation portion 33. And, the horizontal axis of the order graph 78 is converted into the vehicle speed (Step S4 of FIG. 3) and is displayed again (Step S5 of FIG. 3).

When a filter process is carried out with the order taken as a parameter, the lower limit value and the upper limit value of the order, which are picked up by the filter process, are established in the start column 84*a* and the termination column 84*b*, respectively, of the order range area 84. Also, when the vehicle speed-order button 83*d* in the filter setting area 82 is selected, a filter process screen 91 as depicted in FIG. 7 is displayed.

Figure 7:
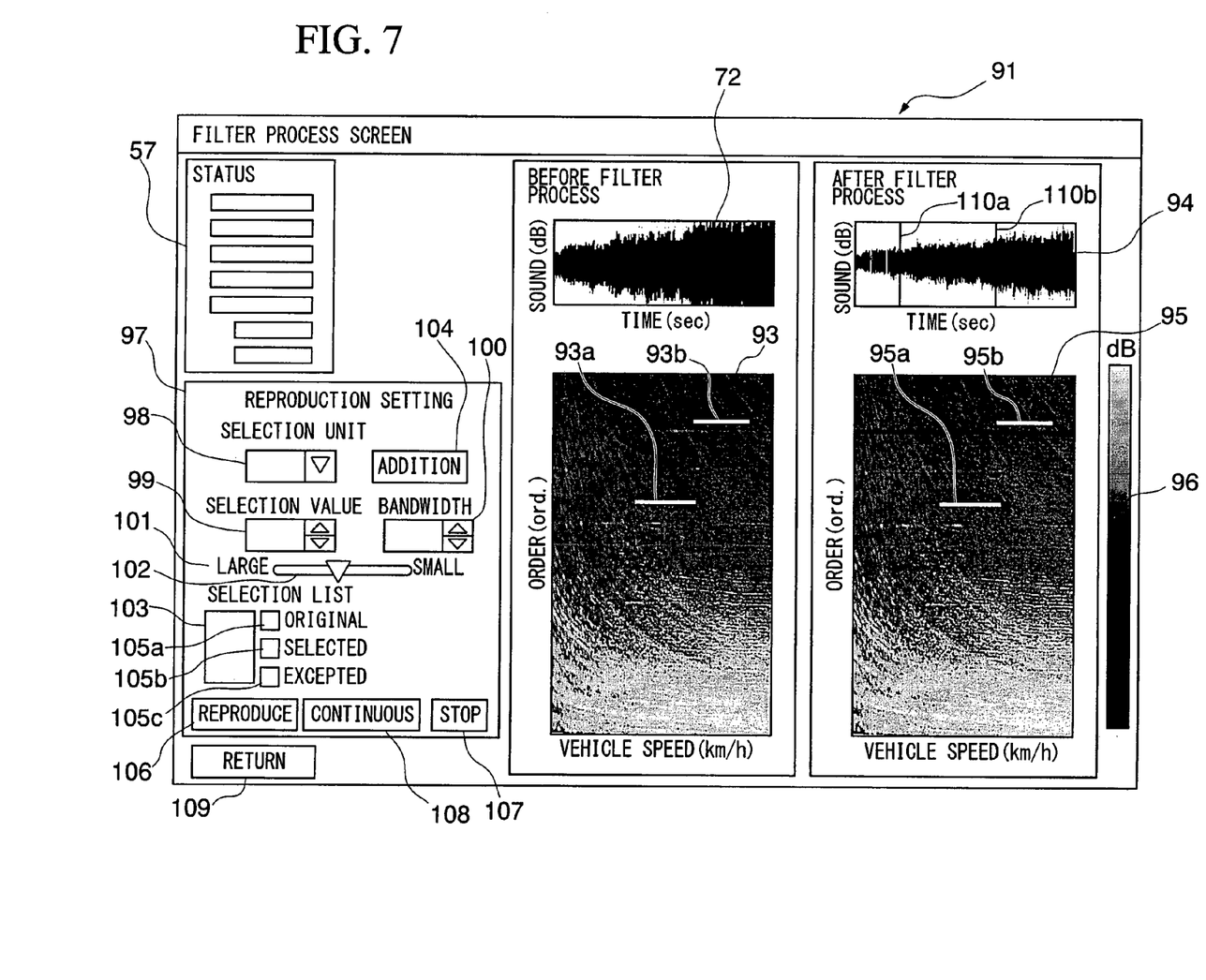
FIG. 7 is a view depicting a filter process screen.

As depicted in FIG. 7, an acoustic graph 92 showing change in sound with respect to time before the filter process and an order graph 93 showing change in order with respect to the vehicle speed are disposed vertically at the middle part of the filter process screen 91. An acoustic graph 94 showing change in sound with respect to time after the filter process and an order graph 95 showing change in order with respect to the vehicle speed are disposed vertically at the right side of the filter process screen 91. Since, in the filter process screen 91, the graphs before the filter process and those after the filter process are juxtaposed at the left and right directions of the screen (that is, the acoustic graph 92 and the acoustic graph 94, and the order graph 93 and the order graph 95), it is possible to visually check the results of the process easily. Respective plots of the order graphs 93 and 95 are classified by colors in compliance with the degree of the acoustic pressure level. Association of the degree of the acoustic pressure level with the colors displayed can be confirmed using a scale 96 at the right side of the order graph 95 after the filter process. A brighter portion 93*a* than in the other peripheral areas is displayed at the middle part of the order graph 93, and a brighter portion 93*b* than in the other peripheral areas is displayed at the right upper part of the same graph. Similarly, a brighter portion 95*a* than in the other peripheral areas is displayed at the middle part of the order graph 95, and a brighter portion 95*b* than in the other peripheral areas is displayed at the right upper part of the same graph. The portions 93*a*, 93*b*, 95*a*, and 95*b* show that abnormal sounds being generated.

The status area 57 is disposed at the left upper part of the filter process screen 91. A reproduction setting area 97 is disposed downward of the status area 57, and is operated when outputting a specified sound from the speaker 23. The reproduction setting area 97 is internally provided with a selection unit column 98 for selecting the types of parameters to which attention is paid when outputting from the speaker 23, a selection value column 99 in which values of the parameters are inputted, a bandwidth column 100 for setting the range of order and the range of frequency, which are extracted as the center value of the selection value, a scale 101 for adjusting the value of the bandwidths, a selection list column 103 in which the types and values of the parameters selected in the selection unit column 98 and the selection value column 99 are displayed, and an addition button 104 for displaying the types and values of the parameter in the selection list column 103. In the selection unit column 98, a pull-down button for displaying the types of selectable parameters is disposed next to the text box in which the names of the parameters are inputted. In the selection value column 99, an increase button for numerical values and a decrease button therefor are disposed next to a text box in which values of parameters are inputted. In the bandwidth column 100, an increase button for numerical values and a decrease button therefor are disposed next to the text box. The scale 101 is provided with a cursor 102 for adjusting the value of the bandwidth. In FIG. 7, the bandwidth is increased by moving the cursor 102 to the left side, and the bandwidth is decreased by moving the cursor 102 to the right side. The type of parameter selected in the selection unit column 98 and the value of the parameter selected in the selection value column 99 are displayed in the selection list column 103. If the addition button 104 disposed next to the selection unit column 98 is selected, the type and value of the parameter are displayed in the selection list column 103. When adding the type and value of a new parameter to the selection list column 103, the addition button 104 is selected.

Three check buttons 105a, 105b, and 105c are disposed at the right side of the selection list column 103 in this order from the top to the bottom. A marking of "Original" (original sound) is attached to the check button 105a. Similarly, a marking of "Selected" (specified component) is attached to the check button 105b, and a marking of "Excepted" (other than the specified component) is attached to the check button 105c. The check button 105a of "Original" is selected when sounds before the filter process are outputted as they are. The check button 105b of "Selected" is selected when only the sounds extracted under a singular or a plurality of conditions selected from the conditions listed in the selection list column 103 are outputted. The check button 105c of "Excepted" is selected when the sounds remaining after excluding the sounds extracted as specified components from the original sounds are outputted.

A reproduction button 106 for outputting the selected sounds from the speaker 23 only one time, a continuous button 108 for repeatedly outputting the selected sounds and a stop button 107 for stopping the output are arranged downward of the selection list column 103 and the respective check buttons 105a, 105b, and 105c. When two or three of the check buttons 105a, 105b, and 105c are selected, sounds selected by the reproduction button 106 are sequentially outputted one time, respectively. Also, with the continuous button 108, the respective selected sounds are repeatedly outputted in turn (Step S6 of FIG. 3).

A return button 109 is disposed downward of the reproduction setting area 97. When the return button 109 is selected, the filter process screen 91 is terminated, and the screen is returned to the order analyzing screen 71 of FIG. 6.

Herein, when an order is inputted in the selection value column 99, it is preferable to select a value equivalent to a portion (portion 93a or portion 95a, or portion 93a or portion 95b) where the value (tone) of the acoustic pressure level is remarkably different from the surroundings in the order graph 93 before the filter process or in the order graph 95 after the filter process. For example, when a portion where the acoustic pressure level is large in comparison with the peripheral portions appears near the order of 67.5 around the vehicle speed of 60 km/h, when the order is set to a selection value 67.5 as a selection unit and "Selected" of the radio box 105b is checked, sounds of the order 67.5 and equivalent to the bandwidth centering around the order are extracted using a band pass filter. In addition, if "Excepted" of the radio box 105c is checked, sounds of the order 67.5 and equivalent to the bandwidth centering the order are eliminated using a band elimination filter.

In this case, it is preferable that information in sounds and notations left by a test driver when carrying out actual running be referred to. That is, when there is a case in which the information from the test driver is "sounds occurred at the speed of 60 km/h at the second gear (speed) stage," portions before and after the speed of 60 km/h may be checked in the order graph 93. Thus, by displaying the order graph 93 in the filter process screen 91 with the vehicle speed as the horizontal axis, it becomes easy to associate the information obtained in actual running with the analysis result.

Furthermore, when the reproduction button 106 is selected in a state in which the reproduction button 106 or continuous button 108 can be selected (in an active state), sounds in orders contained in an area having a predetermined bandwidth centering around the selection value of 67.5 are extracted by the extraction portion 37, and are outputted from the speaker 23. In this case, sounds included in a range sectioned by the start cursor 110a and the termination cursor 110b, which are displayed on the acoustic graph 94, are reproduced one time. In the contrast, when the continuous button 108 is selected, the sounds included in the range section by the two cursors 110a and 110b are continuously reproduced. Also, as reproduction or continuous reproduction is commenced, the stop button 107 is made active. If the stop button 107 is selected while active, it is possible to discontinue the reproduction or the continuous reproduction in mid-process.

Thus, by selecting and reproducing the sounds of only specified components, it is made easy to compare the sounds with the results of the actual listening by the test driver, and it is easy to verify whether or not the selected components are factors of occurrence of abnormal sounds. At this time, if the check button 105a is selected in the filter process screen 91 and the original sounds are reproduced, it is possible to reproduce sounds made by a vehicle when sensory inspection was carried out, and the listening at that time can be checked. Therefore, even if much time has elapsed since actual running, it is possible to reliably verify the factors of occurrence. In addition, if sounds other than the specified components are reproduced, it is possible to predict sounds that will occur in the vehicle 1 after the factors corresponding to the order are eliminated. At this time, unless abnormal sounds occur, replacement of the corresponding gears is sufficient. However, if abnormal sounds still remain, it is considered that there is another factor causing abnormal sounds to occur.

Further, the acoustic vibration analyzing apparatus 20 processes to convert a data file of a recording medium, which is read by the reader unit 21, into data files suitable for respective processes described above, and has an acoustic data recording function for recording sounds of specified components in a universal data format. The acoustic data recording function is achieved by the conversion portion 38. With this function, data processing is enabled by means of a computer, and at the same time, it is possible for another department at a remote area to refer to the analysis result. The universal data format may be a storage format suitable for the OS (Operation system) of a computer which another department has, and suitable for storage and reproduction of sounds, and for example, wav format, au format, aiff format, mp3 format, etc., may be listed. When reading a data file from a recording medium, the acoustic data recording button 44 is initially selected from the menu screen 41 depicted in FIG. 4. Also, when transmitting the analysis result to another computer, the acoustic data recording button 44 is selected after processing is carried out by using the filter process screen 91 (Refer to FIG. 7).

Figure 8:
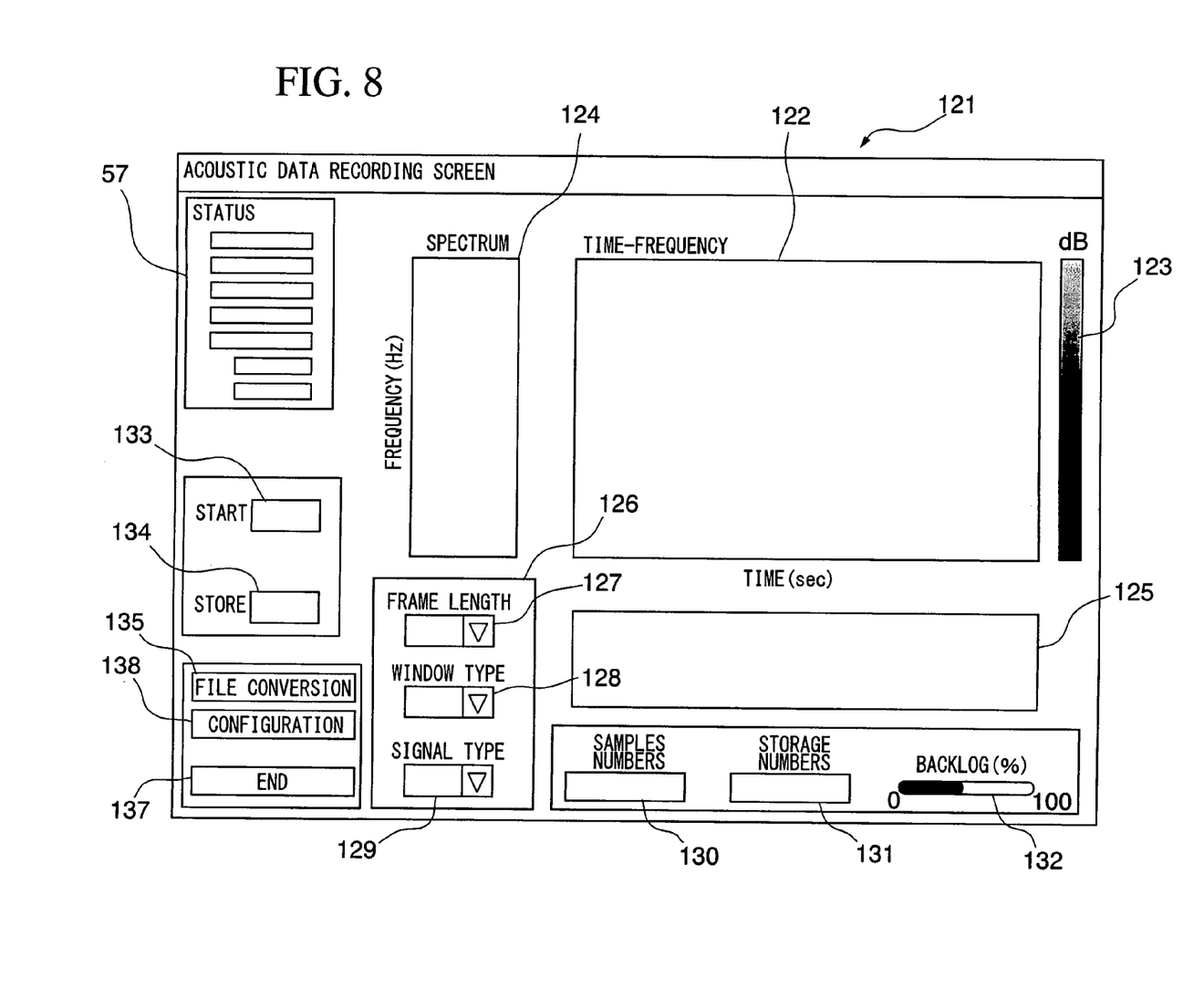
FIG. 8 is a view depicting an acoustic data recording screen.

When the acoustic data recording button 44 is selected, an acoustic data recording screen 121 as depicted in FIG. 8 is displayed on the screen. On the acoustic data recording screen 121, an acoustic graph 122 is disposed from the middle of the screen to the right side thereof, wherein acoustic data read from a recording medium and acoustic data extracted as sounds of specified components are displayed in the form of a graph. The horizontal axis of the acoustic graph 122 indicates time, and the vertical axis thereof indicates frequency. Plots of the acoustic graph 122 are classified by colors in compliance with the degrees of acoustic pressure level. The relationship of the degrees of the acoustic pressure level with colors can be checked using a scale 123 at the right side of the acoustic graph 122. At the left side of the acoustic graph 122, a graph 124 of spectra, which indicates changes in frequency, is disposed. Also, an acoustic graph 125 showing change in voltage value of sounds over time is disposed at the lower side of the acoustic graph 122. Further, an editing area 126 for carrying out data editing is disposed at the lower part of the acoustic data recording screen 121. A frame length column 127 for setting a frame length of data, a window type column 128 for setting the type of window function, and a signal type column 129 for setting the sound and number of revolutions as the type of signals to be recorded are disposed in the editing area 126 in this order from top to the bottom. In these columns 127, 128, and 129, a pull-down button for optionally displaying the preset alternatives is disposed at the side of a text box in which numerical values are directly inputted. Further, a sample number column 130 for selecting or displaying the number of points extracted as a sample and a storage number column 131 for displaying the number of points stored as a data file are disposed. Also the ratio of stored data quantity to entire data quantity is displayed in a back-log display portion 132. In the back-log display portion 132, the present ratio of storage data is displayed in the back-log display portion 132 with the left end as 0% and the right end as 100%.

The status area 57 is disposed at the left upper part of the acoustic data recording screen 121. A start button 133 for reading acoustic data of specified components and a storage button 134 for executing recording of data are disposed below the status area 57. A file conversion button 135 for converting stored data into a universal file format set in advance is disposed at the left lower part of the acoustic data recording screen 121. If a plurality of selectable file formats is set, it is possible to select a file format for conversion by using a configuration button 136. By selecting these buttons 133, 134, and 135, data format conversion can be carried out (Step S7 of FIG. 3). A termination button 137 is disposed downward of the configuration button 136 with wider clearance therebetween than that provided between the file conversion button 135 and the configuration button 136 in order to prevent erroneous operation of the respective buttons 135, 136, and 137.

The data file thus prepared is transmitted to another computer connected to the network by attaching the same to electronic mail or utilizing FTP (File Transfer Protocol). The other computer incorporates a sound source board and a reproduction application, and opens data files read from recording media and data files acquired via the network, and displays the contents thereof or reproduces the sounds. That is, the above-described universal file format set in advance is a file format that another computer making use of data files can use.

In accordance with the present embodiment, when abnormal sounds are generated from the transmission 2, such abnormal sounds are recorded, and are displayed in the form of a graph, wherein it becomes possible to analyze factors by which non-continuous sounds were generated.

When displaying abnormal sounds in the form of a graph, since the frequency is converted into variables (orders) proportionate to the number of teeth of the respective gears 7, 8, and 10 on the basis of the number of revolutions of the second shaft 9, it is possible to reliably identify gears 7, 8, and 10 from which abnormal sounds were generated, regardless of the number of revolutions. In addition, since the graph display of frequency and order is classified by colors in compliance with the degrees of acoustic pressure levels and is plotted, it is possible to easily visually check the speed, number of revolutions, order, or frequency at which abnormal sounds occurred. In particular, since the order and acoustic pressure level are displayed in association with the vehicle speeds, it becomes easy to secure matching between the result that the test driver senses during actual running and the analysis result, and even in a case in which abnormal sounds occur under a specified condition, it is possible to easily identify a gear that is the factor. Since data of a specified order and frequency are extracted and displayed, analysis accuracy can be improved even if there are sounds whose frequencies are similar to each other.

Further, since, through the filter process and reproduction, it becomes possible to output sounds corresponding to a specified order and a specified frequency through the speaker 23 by carrying out a filter process on all sounds, it is possible to check for abnormal sounds that have been actually generated. In addition, since the sounds from which sounds corresponding to a specified order are eliminated are outputted from the speaker 23, it is possible to foresee a subsequent state after the gears 7, 8 and 10 (the object) were replaced. Even when there are multiple factors of occurrence of abnormal sounds, it becomes possible to verify each factor of occurrence individually.

And, as the source of generation of abnormal sounds is thus identified, it is not necessary to check the situation again after identified parts are replaced as conventionally done, that is, to carry out a so-called cross check. Accordingly, it becomes possible to reduce the number of steps of work.

In addition, since it is so devised that abnormal sounds can be heard at another facility at a remote area by way of abnormal sounds being stored in a data file, it becomes possible to hear the actual abnormal sounds at departments for replacement of parts and modification of design even if such departments are located at remote areas, and it becomes easy to grasp and understand the situation and possible to quickly cope with necessary countermeasures.

The invention can be applied without being limited to the above-described embodiment. For example, an object to be inspected may be an apparatus in which there is a possibility for abnormal sounds and vibrations to be generated when a plurality of rotating bodies equipped in a moving body rotate. The object may be a single transmission. The moving body is not limited to an automobile (motorcycles, three-wheeled cycles, four-wheeled vehicles), and may be a tramcar. Also, it may be an engine, or a differential gear of a vehicle. A rotating disk, a spinning body and a roller may be listed as other examples of rotating bodies.

Further, a vibration pickup may be attached to an object to be inspected, vibration data that is generated when the object to be inspected runs acquired instead of acoustic data, frequency of the vibrations analyzed, and orders analyzed. At this time, the acoustic vibration calculation portion 32 of the acoustic vibration analyzing apparatus 20 is made into a vibration calculation portion for calculating the frequency of vibrations and the acoustic pressure level of the vibrations based on the vibration data. Herein, the acoustic pressure level is calculated as a logarithmic ratio of a specified number of vibrations to the maximum value of vibrations. In addition, an acoustic graph (for example, graph 53 of FIG. 5) is displayed in the form of a graph of vibrations by the display control portion 35. Further, sounds outputted from the speaker 23 are made into sounds with respect to the vibrations. When the vibrations accompany sounds that can be heard by a human being, sound corresponding thereto is outputted. In a case in which prevention of vibrations in an object inspected is the objective, it becomes possible to analyze factors using the same analyzing apparatus, and actions and effects as described above can be obtained.

Further, an application program for sound analysis, by which a computer is caused to function as the acoustic vibration analyzing apparatus 20 may be stored in advance in the memory unit 24 depicted in FIG. 2, may be read from a recording medium as necessary, or may be downloaded from the network. Herein, the recording medium records the application program readably by the reader unit 21. In such a case, the application program causes the computer to execute respective steps S1 through S7 as depicted in FIG. 3. In particular, in the reproduction step of Step S7, it is preferable that the program be configured so that original sounds, sounds of specified components and sounds other than the specified components are made selectable, and any one of them is subjected to a reproduction process in compliance with an operation performed by an operator.

Still further, such an application program may be uploaded onto the network in a state in which it can be downloaded, and process circuitry capable of executing the above-respective steps S1 through S7 may be composed of a circuit board or a card which is attachable to and detachable from a computer.

In addition, it may be so devised that the computer carries out only a signal process for reproduction of sounds and the sounds are outputted from a peripheral speaker which is separate from the computer. Similarly, the display unit 22 may be a peripheral display unit separate from the computer which displays the respective screens 41, 51, 71, 91, and 121.

Although the menu screen 41 is displayed at all times while the application program for acoustic vibration analysis is running, a menu equivalent to the menu screen 41 may be attached to the respective screens 51, 71, 91, and 121.

In the order graph 95 after a filter process in the filter process screen 91, the color of an area corresponding to a selected order may be changed, the corresponding area may be enclosed by a ruled line, or an area selected by an operator may be devised so as to be visually checked.

The format of data files prepared by the acoustic data recording process may be text format or CSV (Comma Separated Value) format. This is also available in a case of dealing with vibration data.

As described above, a description was given of a preferred embodiment of the invention. However, the invention is not limited to the above-described embodiment. The invention may be subjected to addition, omission, or replacement of components and other modifications within the range not departing from the spirit of the invention. The invention is not limited by the above description, but it is limited only by the scope of claims attached herewith.

INDUSTRIAL APPLICABILITY

The invention relates to an acoustic vibration analyzing apparatus capable of carrying out analysis of acoustic vibrations by picking up data of sounds or vibrations generated due to rotation of a plurality of rotating bodies and data of a number of revolutions of a rotating body selected from the plurality of rotating bodies when a power transmission mechanism of a vehicle having the plurality of rotating bodies operates. The acoustic vibration analyzing apparatus comprises: frequency analyzing means of calculating data of frequencies of the plurality of rotating bodies by analyzing frequencies of the data of the sounds or vibration; order converting means of calculating orders in response to specifications of the plurality of rotating bodies based on data of frequencies of the plurality of rotating bodies; speed converting means of calculating a speed of the vehicle based on data of the number of revolutions of the plurality of rotating bodies; and means of displaying acoustic pressure levels acquired based on the data of the sounds or vibrations in a manner corresponding to the orders and the vehicle speed.

Since the acoustic vibration analyzing apparatus of the invention calculates an order of sounds or vibrations and displays the acoustic pressure level corresponding to the calculated order and vehicle speed, it becomes possible to identify a source of generation of abnormal sounds and vibrations that are generated in response to changes in the vehicle speed. In addition, since matching with sensory inspection can be easily carried out, it becomes easy to check for generation of abnormal sounds and vibrations and to identify the source of generation thereof. Furthermore, since the source of generation of abnormal sounds and vibrations can be reliably identified, this contributes to reducing the number of processes in replacement work. Since the source of generation of abnormal sounds and vibrations can be identified by the order regardless of the number of revolutions of a rotating body, the source of generation of abnormal sounds and vibrations can be efficiently controlled and distinguished even if there is a plurality of rotating bodies having similar frequencies.

The present invention relates to a method of analyzing acoustic vibrations by picking up data of sounds or vibrations that are generated due to rotation of a plurality of rotating bodies and data of the number of revolutions of a rotating body selected from the plurality of rotating bodies when a power transmission mechanism of a vehicle having the plurality of rotating bodies operates. This method comprises: a frequency-analyzing step of calculating frequencies of the plurality of rotating bodies by analyzing frequencies of the data of the sounds or vibrations; an order converting step of calculating an order responsive to specifications of the plurality of rotating bodies based on data of frequencies of the plurality of rotating bodies; a speed-converting step of calculating speeds of the vehicle based on data of numbers of revolutions of the rotating bodies; and a displaying step of displaying acoustic pressure levels acquired based on the data of the sounds or vibrations in a manner corresponding to the order and the vehicle speed.

Since, in accordance with the invention, the order of sounds or vibrations is calculated based on the measured data, and the acoustic pressure level corresponding to the calculated order and the vehicle speed is displayed, it becomes possible to identify the source of generation of abnormal sounds and vibrations that are generated in response to changes in the vehicle speed. Therefore, since the source of generation of abnormal sounds and vibrations can be easily and reliably identified, it is possible to reduce the number of processes for replacement work and adjustment work for parts, etc.

The invention relates to an acoustic vibration analyzing program by which acoustic vibration analysis is carried out by causing data of sounds or vibrations generated due to rotation of a plurality of rotating bodies and data of the number of revolutions of a rotating body selected from the plurality of rotating bodies picked up by a computer when a power transmission mechanism of a vehicle having the plurality of rotating bodies operates. This program comprises: a frequency-analyzing step of calculating frequencies of the plurality of rotating bodies by analyzing frequencies of the data of the sounds or vibrations; an order converting step of calculating an order responsive to specifications of the plurality of rotating bodies based on data of the frequencies of the plurality of rotating bodies; a speed-converting step of calculating speeds of the vehicle based on data of the numbers of revolutions of the rotating bodies; and a displaying step of displaying acoustic pressure levels acquired based on the data of the sounds or vibrations in a manner corresponding to the order and the vehicle speed.

The invention relates to a recording medium readable by a computer, by which acoustic vibration analysis is carried out by causing data of sounds or vibrations generated due to rotation of a plurality of rotating bodies and data of a number of revolutions of a rotating body selected from the plurality of rotating bodies to be picked up by a computer when a power transmission mechanism of a vehicle having the plurality of rotating bodies operates. The recording medium stores a program comprising: a frequency-analyzing step of calculating frequencies of the plurality of rotating bodies by analyzing frequencies of the data of the sounds or vibrations; an order converting step of calculating an order responsive to specifications of the plurality of rotating bodies based on data of the frequencies of the plurality of rotating bodies; a speed-converting step of calculating speeds of the vehicle based on data of the numbers of revolutions of the rotating bodies; and a displaying step of displaying acoustic pressure levels acquired based on the data of the sounds or vibrations in a manner corresponding to the order and the vehicle speed.

In accordance with the invention, by only causing a program for acoustic vibration analysis to be executed by a computer, acoustic vibration analysis can be carried out, and it is possible to identify the source of generation of abnormal sounds and vibrations.

The invention claimed is:

1. An acoustic vibration analyzing apparatus capable of carrying out analysis of acoustic vibrations by picking up data of sounds or vibrations generated due to rotation of a plurality of rotating bodies and data of a number of revolutions of a rotating body selected from the plurality of rotating bodies when a power transmission mechanism of a vehicle having the plurality of rotating bodies operates, said acoustic vibration analyzing apparatus comprising:
frequency analyzing means for calculating data of frequencies of the plurality of rotating bodies by analyzing frequencies of the data of the sounds or vibrations;
order converting means for calculating orders in response to specifications of the plurality of rotating bodies based on data of frequencies of the plurality of rotating bodies;
speed converting means for calculating speed of the vehicle based on data of the number of revolutions of the plurality of rotating bodies;
means for displaying acoustic pressure levels acquired based on the data of the sounds or vibrations in a manner corresponding to the orders and the vehicle speed; and
means for reproducing sounds having a specified order selected based on display of the displaying means.

2. The acoustic vibration analyzing apparatus according to claim 1, wherein the reproducing means selectively reproduces any one of original sounds consisting of the sounds or vibrations, sounds having the specified order, and sounds remaining after excluding sound components having the specified order from the original sounds.

3. The acoustic vibration analyzing apparatus according to claim 1, further comprising means for converting data of the sounds reproduced by the reproducing means into a file in a predetermined data format.

4. A method of analyzing acoustic vibrations by picking up data of sounds or vibrations that are generated due to rotation of a plurality of rotating bodies and data of the number of revolutions of a rotating body selected from the plurality of rotating bodies when a power transmission mechanism of a vehicle having the plurality of rotating bodies operates, said method comprising:
a frequency-analyzing step of calculating frequencies of the plurality of rotating bodies by analyzing frequencies of the data of the sounds or vibrations;
an order converting step of calculating an order responsive to specifications of the plurality of rotating bodies based on data of frequencies of the plurality of rotating bodies;
a speed-converting step of calculating speeds of the vehicle based on data of numbers of revolutions of the rotating bodies;
a displaying step of displaying acoustic pressure levels acquired based on the data of the sounds or vibrations in a manner corresponding to the order and vehicle speeds; and
a step of reproducing sounds when reproduction of sounds having a specified order are selected, based on a display made in the displaying step.

5. The method of analyzing acoustic vibrations according to claim 4, wherein the reproducing step involves selectively reproducing any one of original sounds consisting of the sounds or vibrations, sounds having the specified order, and sounds remaining after excluding sound components having the specified order from the original sounds.

6. A recording medium readable by a computer, by which acoustic vibration analysis is carried out by causing data of sounds or vibrations generated due to rotation of a plurality of rotating bodies and data of a number of revolutions of a rotating body selected from the plurality of rotating bodies picked up by a computer when a power transmission mechanism of a vehicle having the plurality of rotating bodies operates, wherein said recording medium stores a program comprising:
a frequency-analyzing step of calculating frequencies of the plurality of rotating bodies by analyzing frequencies of the data of the sounds or vibrations;
an order converting step of calculating an order responsive to specifications of the plurality of rotating bodies based on data of the frequencies of the plurality of rotating bodies;
a speed-converting step of calculating speeds of the vehicle based on data of the numbers of revolutions of the rotating bodies;
a displaying step of displaying acoustic pressure levels acquired based on the data of the sounds or vibrations in a manner corresponding to the order and the vehicle speed; and
a step of reproducing sounds when reproduction of sounds having a specified order are selected, based on a display made in the displaying step.

* * * * *